United States Patent [19]

Skripsky

[11] 3,734,151
[45] May 22, 1973

[54] PORTABLE WORKBENCH

[76] Inventor: Harold O. Skripsky, 4296 Fox Meadow S. E., Cedar Rapids, Iowa 52403

[22] Filed: Sept. 21, 1970

[21] Appl. No.: 73,717

[52] U.S. Cl. ............................... 144/1 R, 144/286 R
[51] Int. Cl. ............................. B27c 9/00, B27b 5/16
[58] Field of Search ....................... 144/1 R, 1 E, 1 F, 144/1 G, 286 R; 143/1 R, 132 A, 132 F, 134 R, 6 G, 47 H, 47 I

[56] References Cited

UNITED STATES PATENTS

| 2,803,271 | 8/1957 | Shaw | 143/6 G |
| 2,810,412 | 10/1957 | Roug | 143/132 A |
| 2,787,305 | 4/1957 | Hess et al. | 143/169 X |

Primary Examiner—Donald R. Schran
Attorney—Hill, Sherman, Meroni, Gross & Simpson

[57] ABSTRACT

A portable collapsible workbench having openings through the top to receive tool base plates, the workbench having associated therewith workpiece fence guides for aligning the workpiece and a workpiece support for positioning a workpiece along an edge of the table top, the tools being positionable to move a workpiece across the operative part of the tool or to move the operative part of the tool across the workpiece.

3 Claims, 10 Drawing Figures

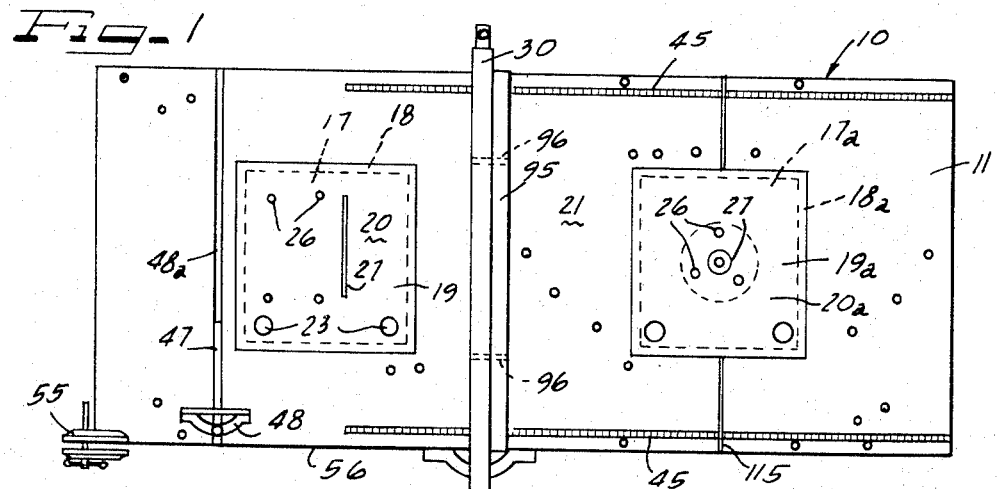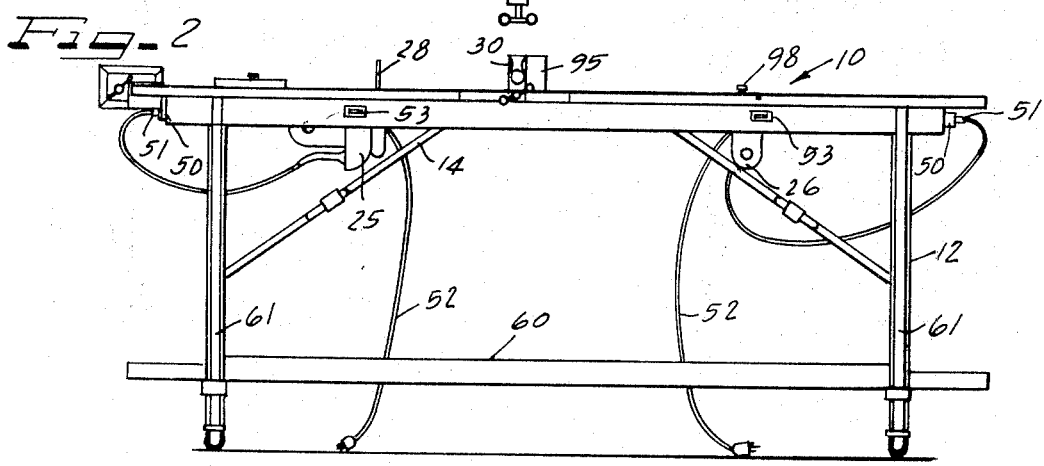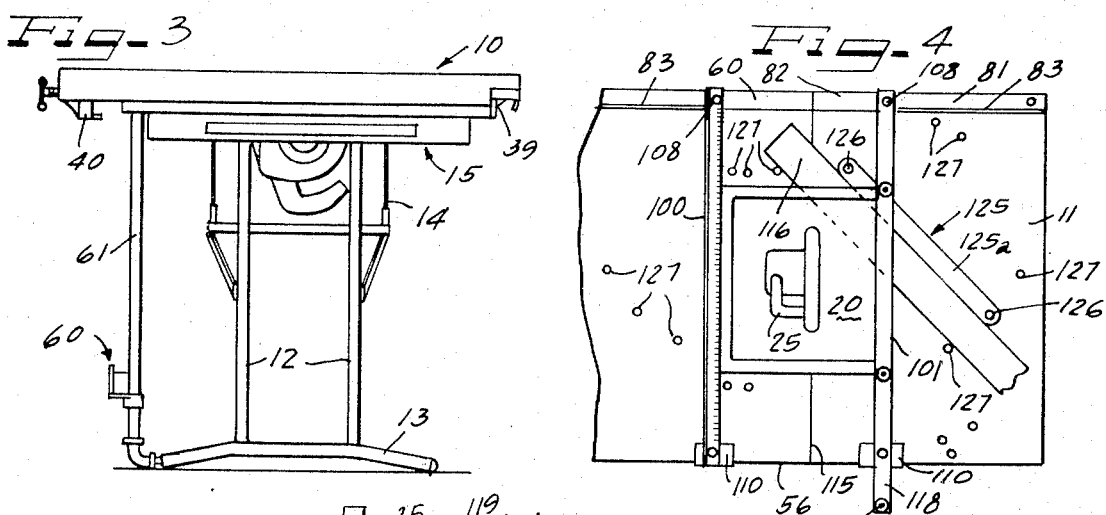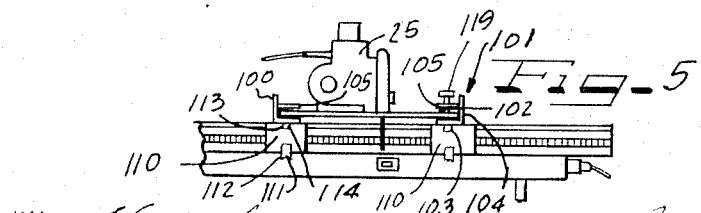

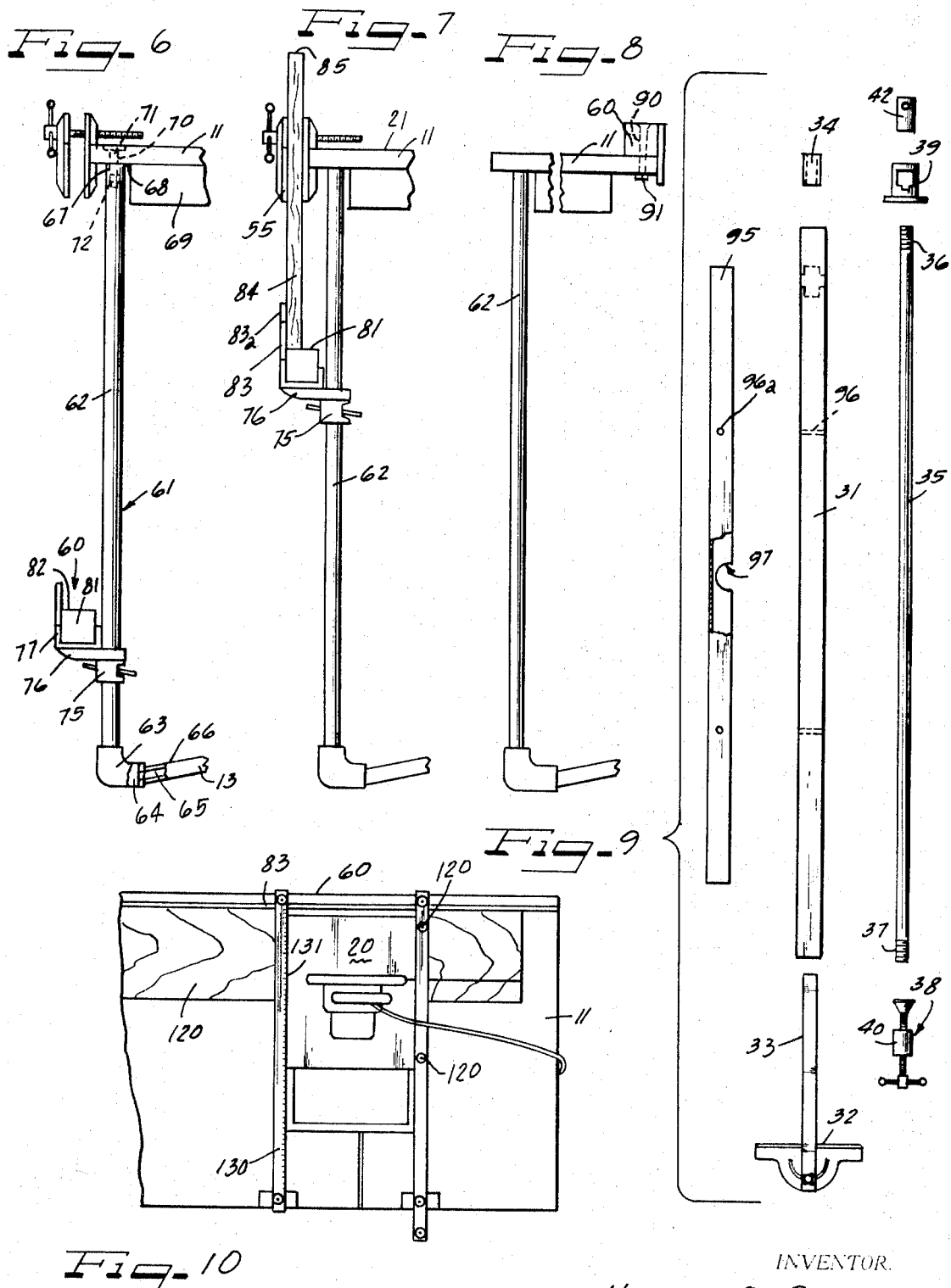

PORTABLE WORKBENCH

BACKGROUND OF THE INVENTION

1. Field of the Invention

This invention relates to supports and more particularly to a workbench support for tools.

2. Prior Art

Collapsible workbenches are known to the art and it has been known to provide attachment devices within the confines of the workbench for attaching power tools. However, such prior art devices have generally been restricted in their use and have not provided a truly multi-use table capable of taking advantage of the power tool under all conditions.

Two such tools normally used in connection with supporting workbenches are circular saws and routers. Specifically in connection with a circular saw, it is oftentimes desirable to move the workpiece across the working area of the saw, as in the case or ripping large sheets of material. At other times, however, it is desirable to move the saw over the workpiece, as in the case of finished sawing, mitering etc. Most prior art workbenches provide for receipt of the saw either with the blade projecting through the workbench to the top thereof or with the saw being supported above the workbench to act upon a workpiece received on the workbench. Further, the prior art has usually limited the direction of the saw blade requiring sawing one way only. This is disadvantageous in that it limits the versatility of the device, either restricting the size of the material which can be sawed easily, or requiring the operator to move the workpiece or the saw in an inconvenient manner.

Further, such prior art portable workbenches were not adapted for gripping large workpieces such as doors, in a manner which would allow work to be performed on their edges.

SUMMARY OF THE INVENTION

The present invention overcomes these disadvantages of the prior art and provides an improved versatile workbench. The workbench is constructed around a foldable leg collapsible table having a relatively large flat surface area at the top thereof. Square openings are provided through the table top into which are received square base plates to which tools have been attached. In the case of a saw, the saw is attached to one side of the plate with the blade projecting through a slot therein. The plate is then received in the aperture with the saw blade extending above the table. Because the plate and the opening are rectangular, the saw may be positioned for cutting operation from any side.

Further, a fence guide is provided extending across the width of the table for guiding a workpiece with its edge a measured distance from the saw blade. Distance indicia are also provided on the top of the table measuring from the saw blade. Additionally, a slidable work guide is provided to move the workpiece, maintaining it at a desired angle to the face of the blade.

Electrical connections are provided on the table for controlling the motor of the saw. A bench rest is provided along one longitudinal edge of the table, and is supported in a manner which allows it to be moved from a position adjacent the top of the table to a position adjacent the floor. The bench rest can therefore support a workpiece of large cross section, such as a door, on its edge with one edge projecting above the top of the table to be worked upon.

Additionally, a pair of spaced support guides are mountable across the top of the table elevated from the table. The spaced guides can receive the saw base plate with the motor positioned thereatop whereby the saw may be moved on the guides across the face of the table to work on a workpiece between the guides and the top of the table.

Further, the top of the table may have a series of recesses therein cooperating with a work guide to allow the work guide to be positioned at a predetermined angle with respect to movement of the saw blade when received in the guides. In this manner, miter work may be done on a workpiece simply by abutting it against the guide and thereafter moving the saw across it.

It is therefore an object of this invention to provide an improved versatile portable workbench.

It is a further object of this invention to provide a portable workbench adapted to receive power tools.

It is yet another and more specific object of this invention to provide a workbench which is adapted to receive power tools in a manner which allows their use in a multiplicity of positions.

It is yet another and specific object of this invention to provide a portable, collapsible workbench adapted to receive power tools in a multiplicity of positions, the workbench including an adjustable bench rest for positioning a workpiece with an edge projecting above the top of the workbench for work thereon.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 is a top plan view of a workbench constructed according to the principles of this invention.

FIG. 2 is a side plan view of the workbench of FIG. 1.

FIG. 3 is an end plan view of the workbench of FIGS. 1 and 2.

FIG. 4 is a fragmentary top plan view of the workbench of this invention illustrating a movable saw feature thereof.

FIG. 5 is a side plan view of the workbench of FIG. 4.

FIG. 6 is a fragmentary end plan view of the workbench illustrating the adjustable bench rest in a lowered position.

FIG. 7 is a view similar to FIG. 6 illustrating the bench rest in a higher position.

FIG. 8 is a view similar to FIGS. 6 and 7 illustrating the bench rest position atop the table.

FIG. 9 is a exploded plan view of the fence guide of the workbench of this table.

FIG. 10 is a view of the device illustrated in FIGS. 4 and 5 with the saw received in a different position.

DESCRIPTION OF THE PREFERRED EMBODIMENTS

FIGS. 1 through 3 illustrate the portable workbench 10 of my invention. The workbench 10 consists of a table top 11 supported by collapsible legs 12 which have a bottom cross support 13. The legs 12 may be braceable in an open position through foldable braces 14 connecting the legs 12 to the underside 15 of the table top 11.

The table top 11 has one or more square openings 17, 17a (illustrated by broken lines) extending therethrough. The openings 17, 17a have recessed ledges 18, 18a around their periphery and the width of the opening with the ledge portion is dimensioned to receive a square base plate 19, 19a. The width of the ledges 18, 18a is dimensioned so as to provide a firm support for the bottom of the base plates 19, 19a and the depth of the ledges is substantially equal to the thickness of the base plates whereby when the base plates are received in the ledged openings, their tops 20 and 20a are flush with the top 21 of the table top 11. The base plates 20 and 20a are preferably provided with finger holes 23 for facilitating removal of the base plates from the openings and also for making adjustments on the tools.

Because the openings 17 and 17a and the base plates 20 and 20a are square, the base plates may be removed from the opening and re-inserted after rotation 90° or 180° in either direction.

Power tools such as a rotary blade saw 25 and a router 26 are then affixed to the underside of the plates 19 and 19a as by screws 26. Openings 27 are provided through the plates 19, 19a so that the operative portion of the tool will project above the surface of the table top. This invention should not be restricted to certain power tools. A large number of them may be adapted to base plates and used. A saber saw would be one example. In the case of the saw, the operative surface is the blade 28 and the blade guard if desired.

A rip fence 30 is provided which is enclampable across the width of the table thereatop. The rip fence may be disassembled and the parts used separately when needed.

The rip fence is best illustrated in FIG. 9, and it includes a U or square cross section beam 31 which is hollow in the center. A protractor or square 32 with an extension therearound 33 is received in one end of the beam 31 and attached thereto. A bushing 34 is received in the opposite end of the beam 31 and guides a pipe 35 which is threaded at either end 36, 37. The pipe 35 extends slightly beyond the terminus end of the beam 31 or alternatively portions of the ends of the beam 31 may be undercut to allow access to the threaded ends 36, 37 of the pipe. A standard pipe clamp is then formed between an adjustable clamp member 38 and a corresponding enclamping member 39 received on the other end of the pipe. By adjusting the clamp member 38 on the threads 37, it can be seen that the distances between the clamp portion 40 of the pipe clamp 38 and the member 39 will be reduced. This allows the saw fence to be enclamped across the top of the table in the position illustrated in FIGS. 1 through 3. While the member 39 may be threaded onto the threads 36, it can also be received loosely around the pipe 35 with the threaded pipe coupling 42 threaded onto the end 36.

Rulers or other measuring indicia 45 are embedded in the table top 11 to provide a positioning indicator for the fence 30. The indicia may measure from the centerline of the opening 27 through which the blade 28 projects so as to allow setting of the fence 30 a given distance from the blade. The measurement indicia may also read from the centerline of the other opening so as to be usable with respect thereto. Of course it is to be understood that the indicia may be plural as is the case illustrated in FIG. 1 and may include indicia running across the width of the table measuring from the edge or from the center of any other appropriate point.

A workpiece guide 47 is provided in a groove 48 adjacent one of the openings. The workpiece guide 47 includes an adjustable protractor 48 for engaging an edge of the workpiece at a desired angle to move it across the sawblade 28. By providing the groove 48a parallel to the slot 27 when the base plate 19 is received in the position illustrated in FIGS. 1 and 2, it is possible to cut a workpiece at any desired angle by adjusting the protractor angle 48.

Electrical connections 50 are provided at either end of the table top 11 to receive the plugs 51 of the power tools. The electrical connections 50 are in turn provided with plugs 52 to be inserted into the proper receptacles. The electrical connections 50 may be actuated by switches 53 disposed on the side of the table top 11 at the front thereof immediately in line with the openings 19, 19a to control the power tools received in those openings.

A vise 55 is provided preferably at the front edge 56 of the table top 11 and is designed to enclamp a member received between the jaws thereof in a position adjacent the front edge of the table top.

An adjustable bench rest 60 is provided to support oversized workpieces adjacent the front edge of the table for work on their edges. The bench rest 60 is supported on a pair of leg members 61 disposed adjacent either end of the table.

As best illustrated in FIGS. 6 and 7, the legs 61 consist of hollow pipes 62 with elbows 63 threaded on their bottoms. The other end 64 of the elbow has a rod projection 65 thereon. The rod projection 65 is dimensioned to be received within the open end 66 of the table leg cross member 13. The projection of the rod member 65 into the end 66 serves to hold the leg 61 firmly in position with respect to the cross member 13. The other end 67 of the pipe 62 is opened and the length of the pipe is dimensioned so that it underlies the bottom surface 68 of the table top 11 at a point where the table top 11 projects beyond the table's side walls 69. Apertures 70 extend through the table top 11 in the overhanging portion and are preferably countersunk at the top thereof. The apertures 70 overlie the end 67 of the pipe 62 and bolts 71 extending therethrough anchor the pipe to the table top 11. Nuts 72 may be disposed interiorly of the pipe 61 adjacent the top thereof to receive the bolt 71.

Two leg members 61 are then provided adjacent either end of the table at the front thereof. Adjustable sleeve brackets 75 are positioned on each of the legs 61 and are slidable therealong and tightenable to remain in any given position along the length of the legs 61. The brackets 75 have projecting ledges 76 associated therewith onto which are attached U-shaped cross section brackets 77. The opening of the U projects upwardly towards the top of the table and receives the bench rest piece 60. The bench rest piece 60 is dimensioned to extend between the U-shaped bracket 77 attached to the two legs 61 and may overlap to either side thereof. Preferably, the bench rest piece 60 has a main portion 81 with a top surface 82 and a back wall portion 83 attached to one side of the main portion 81.

The back wall portion 83 extends above the top surface 82 of the main portion 81.

As best illustrated in FIG. 7, a large workpiece such as a door 84 can be received atop the main portion 81 and backed against the back wall portion 83. With the clamps 75 adjusted with respect to the height of the workpiece 84, it is possible to enclamp the workpiece 84 with the vise 55 so that an edge 85 of the workpiece projects above the top 21 of the table top 11 for work thereon. Because the sleeve clamps 75 are adjustable the entire length of the table, the bench rest 60 can therefore be adjusted to receive workpieces of varying dimensions. Further, by raising the clamps 75, a workpiece of given dimensions may be positioned with a desired length of it projecting above the table top 11 for work thereon from the edge or side.

By extending the backing member 83 as illustrated at 83a in FIG. 7, a table top backup can be provided by raising the adjustable bench rest to its highest position so that the top of the back member 83a will project above the top of the table. Alternatively, as illustrated in FIG. 8, the adjustable bench rest 60 can be removed from the U-shaped bracket 77 and placed atop the table top 11. Provision of bolt holes 90 through the main member 81 and through the table top 11 provides for securing the adjustable bench rest 60 to the table top by dropping bolts 91 through the openings 90.

In those instances where one of the tools to be used in one of the openings 18, 18a is a router 26, a router fence guide 95 is provided. The router fence guide 95 is attached to the rip fence guide 30 by bolts 96 extending through bolt holes 96a. The bolt holes 96a in the member 31 are provided so as to not interfere with the threaded pipe 35. The router fence guide 95, as best illustrated in FIG. 9, has relieved areas 97 in the side thereof so that the tool head 98 of the router can be positioned partially interiorly of the fence 95. Alternatively, if the member 31 is made tall enough and if the threaded pipe 35 is disposed in the upper portions thereof, then the recessed areas 97 may be provided in the rip fence guide 30. Preferably the relieved areas 97 are provided in both sides of the guide 95 and the guide is attachable to either side of the rip fence guide 30. The router fence guide 95 would also be provided with its own separate locking device so it could be used by itself and not in conjunction with the rip fence guide 30 when desired. Also, a regular router fence could be provided for this tool.

It is oftentimes desirable to move the saw with respect to the workpiece, as for example when grooving or mitering, and my invention provides an adaptation for the workbench which will enable this to be done.

The adaptation consists of two guide members 100 and 101 which are mountable atop the table. The guide members, best illustrated in FIGS. 4 and 5, comprise elongated strips having spaced-apart horizontal legs 102, 103 connected by a vertical wall 104 at one edge thereof, thereby providing a channel 105 between the legs.

The guides 100, 101 are mounted atop the table top 11 in spaced-apart relation with the channels 105 open towards one another. The guides 100, 101 are mounted atop the table top 11 with the bench rest member 60 in the position illustrated in FIG. 8. As best illustrated in FIG. 4, the back member 83 has a section thereof incomplete to provide a gap. The member 81 has two spaced-apart openings 108 through the top surface 82 thereof and pins project from the bottom of the guide members 100, 101 to be received in the openings 108. Spacing blocks 110 are positioned at the front edge 56 of the table top 11 and may have pins 111 projecting from the bottoms thereof which are received in openings 112 in the table top 111 as illustrated in FIG. 5. The guides 100, 101 also have locking pins 113 projecting from the bottom thereof in a position to project into openings 114 in the spacing blocks 110. With the guides 100, 101 mounted atop the member 60 at the rear of the table and mounted atop the spacing blocks 110 at the front of the table, the guides will be elevated above the table an amount equal to the height of the spacing blocks 110 and the member 81.

The guides 100, 101 are spaced apart a distance equal to the width of the base plate 19 to which the saw 25 is attached. The base plate can then be removed from the opening 18 and mounted on the guides with the edges of the base plate projecting into the channels 105. Preferably the edges of the base plate 20 will contact the vertical wall 104. The saw is then slidable on its base plate across the width of the table in the guides 100, 101. By inverting the base plate, the saw will be positioned thereatop as in FIG. 5 with the saw blade projecting down towards the table. A groove 115 is provided in the top of the table 11 so that the saw blade may project thereinto to cut through a workpiece 116 placed between the saw position and the table top.

One of the guides 101 has an extension 118 thereon projecting beyond the front of the table which terminates in an abutment member 119 which is projectable into the slot 105 to prevent the saw from being drawn backward out of the guides. It can be seen that the base plate 20 will contact the abutment member, preventing further movement thereof.

Because the base plate 20 is square, it may be placed in the guides with the saw adapted to extend across the width of the table or the length of the table as illustrated in FIG. 10. In this position, hold-down screws 120 may be provided through the top leg 102 of the guide 11 to hold the base plate in a set position. This allows a workpiece 121 to be placed atop the table and moved with respect to the now-stationary inverted saw for rip cutting.

Additionally, as illustrated in FIG. 4, my invention provides an angled saw guide 125. The saw guide 125 consists of a backing strip 125a which has pins 126 located adjacent either end. The pins 126 are dimensioned to be received in a plurality of recesses 127 which are located on the table top 11 at points positioned with respect to the groove 115, so that a definite angle is formed when the member 125a has the pins 126 inserted in the recesses 127. In this manner, as is illustrated in FIG. 4, a workpiece abutting the member 125a will project across the groove 115 such that when the saw is moved across the workpiece to cut it, a definite angle is established.

In order to aid in the placement of the saw as illustrated in FIG. 10, a series of measurement indicia 130 may be placed on top of the guide member 100 dimensioned to measure from the back wall 83 of the bench rest 60 when it is positioned atop the table top 11. Further, a marking point 131 may be established atop the base plate 20 indicating the centerline of the saw blade.

It can therefore be seen from the above that my invention provides a novel workbench having a number of features allowing its use in a plurality of ways.

I claim:

1. A portable workbench which comprises: a table top with at least two openings therethrough, the openings each having a recessed peripheral top ledge, the table top supported on collapsible legs, base plates dimensioned to be received within the openings resting on the ledge having their top surfaces flush with the surface of the table top, different power tools attached to the undersurfaces of each of said base plates depending therefrom, said openings and said base plates square, said base plates having finger holes therethrough for removal from the said openings, guide means attachable to said table top in spaced-apart fixed position, said guide means attached to said table top at a point spaced above the said table top, said guide means receiving the said base plates one at a time to support it above the said table top, the said guide means extending across the width of the said table, the said base plate being selectively slidable across the width of the said table when received in the said guide means and selectively positionable on the said guide means in fixed position relative to the said table top, and a fence guide, said fence guide movably attached to the said table top intermediate the said openings, the fence guide extending across the table intermediate the openings, said fence guide having a recess in its undersurface aligned with the center of at least one of said openings, said fence guide usable to position a workpiece relative to either of said openings, and the said base plates receivable in either opening whereby tools attached to the said base plate may have their working portions project from the said top surface of the said base plate and be usable in either opening or in the said guide means in fixed or movable relation to the table top.

2. The workbench according to claim 1 further including means for accurately positioning a workpiece with respect to the blade of a saw mounted on a base plate when the base plate is received in the said opening.

3. The workbench of claim 2 further including means for accurately positioning a workpiece with respect to the line of movement of the saw blade when the base plate is received in the said guide, the means adjustable to position the said workpiece across the said line at one of a plurality of predetermined angles relative thereto.

* * * * *